(12) United States Patent
Chae et al.

(10) Patent No.: US 6,602,323 B2
(45) Date of Patent: Aug. 5, 2003

(54) METHOD AND APPARATUS FOR REDUCING PFC EMISSION DURING SEMICONDUCTOR MANUFACTURE

(75) Inventors: Seung-Ki Chae, Seoul (KR); Sang-Gon Lee, Gyeonggi-do (KR); Sang-Hyuk Chung, Gyeonggi-do (KR); Seong-Jin Heo, Gyeonggi-do (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 82 days.

(21) Appl. No.: 09/946,632

(22) Filed: Sep. 6, 2001

(65) Prior Publication Data

US 2002/0134233 A1 Sep. 26, 2002

Related U.S. Application Data (60) Provisional application No. 60/277,278, filed on Mar. 21, 2001.

(51) Int. Cl.[7] .............................................. B01D 50/00
(52) U.S. Cl. ................... 95/8; 95/149; 96/243; 96/244; 96/264; 118/715; 438/905
(58) Field of Search .................. 95/149, 8; 96/243, 96/244, 264; 438/905, 909; 118/715

(56) References Cited

U.S. PATENT DOCUMENTS

| | | | |
|---|---|---|---|
| 4,725,204 A | * | 2/1988 | Powell |
| 5,538,536 A | | 7/1996 | Fuentes et al. |
| 5,759,237 A | | 6/1998 | Li et al. |
| 5,785,741 A | | 7/1998 | Li et al. |
| 5,858,065 A | | 1/1999 | Li et al. |
| 5,873,942 A | * | 2/1999 | Park et al. |
| 5,919,285 A | | 7/1999 | Li et al. |
| 5,925,167 A | * | 7/1999 | Smith |
| 6,017,382 A | * | 1/2000 | Ji et al. |
| 6,037,272 A | * | 3/2000 | Park et al. |
| 6,174,366 B1 | * | 1/2001 | Ihantola |
| 6,187,072 B1 | | 2/2001 | Cheung et al. |
| 6,214,089 B1 | | 4/2001 | Li et al. |
| 6,251,192 B1 | * | 6/2001 | Kawamura et al. |
| 6,277,173 B1 | * | 8/2001 | Sadakata et al. |
| 2002/0134233 A1 | * | 9/2002 | Chae et al. |

FOREIGN PATENT DOCUMENTS

| | | |
|---|---|---|
| EP | 0819779 | 1/1998 |
| EP | 1048337 | 11/2000 |
| EP | 1103297 | 5/2001 |
| JP | 11221437 | 8/1999 |
| JP | 2000342931 | 12/2000 |

\* cited by examiner

*Primary Examiner*—Duane S Smith
(74) *Attorney, Agent, or Firm*—Lee & Sterba, P.C.

(57) ABSTRACT

A method of reducing PFC emissions during a semiconductor manufacturing process that includes a set of sub-processes each of which produces at least one PFC includes the steps of exhausting PFC's produced by each sub-process to a common line to form a combined exhaust stream, treating the combined exhaust stream from each sub-process using a separate PFC abatement system, combining the treated exhaust streams to form a combined treated stream, and wet scrubbing the combined treated stream.

17 Claims, 7 Drawing Sheets

METHOD AND APPARATUS FOR REDUCING PFC EMISSION DURING SEMICONDUCTOR MANUFACTURE

This application is based on U.S. Provisional Patent Application Ser. No. 60/277,278, filed Mar. 21, 2001, the disclosure of which is incorporated in its entirety herein by reference.

BACKGROUND OF THE INVENTION

1. Field of the Invention

The present invention relates to a method and system for reducing the emission of PFC's (perfluoro compounds) during semiconductor manufacturing processes.

2. Background of the Invention

Effluent gases emitted during semiconductor manufacturing processes, for example during CVD chamber cleaning and dry etch processes, frequently contain perfluoro compounds (PFC's). PFC's are global warming gases, and significant efforts have been and are continuing to be made to reduce and minimize the amount of PFC's that are emitted into the atmosphere. In particular, a convention of the World Semiconductor Council, including the United States, Europe, Japan, Taiwan and Korea, seeks to reduce the amount of PFC emission by 10% by the year 2010, with the following basis years: United States, Europe, Japan: 1995; Korea: 1997; Taiwan: 1998.

Known procedures for reducing the amount of PFC emission include use of abatement scrubbers, capture and recycle, use of alternative process gases, and process optimization. Common types of abatement scrubbers useful for the removal of PFC's include (a) combustion-type scrubbers with LNG, LPG, $H_2$ and/or $CH_4$, (b) chemisorption-type scrubbers using metal oxides and physical adsorption-type scrubbers using active carbon or zeolite surfaces, and (c) decomposition-type scrubbers using a plasma.

Figure 1:
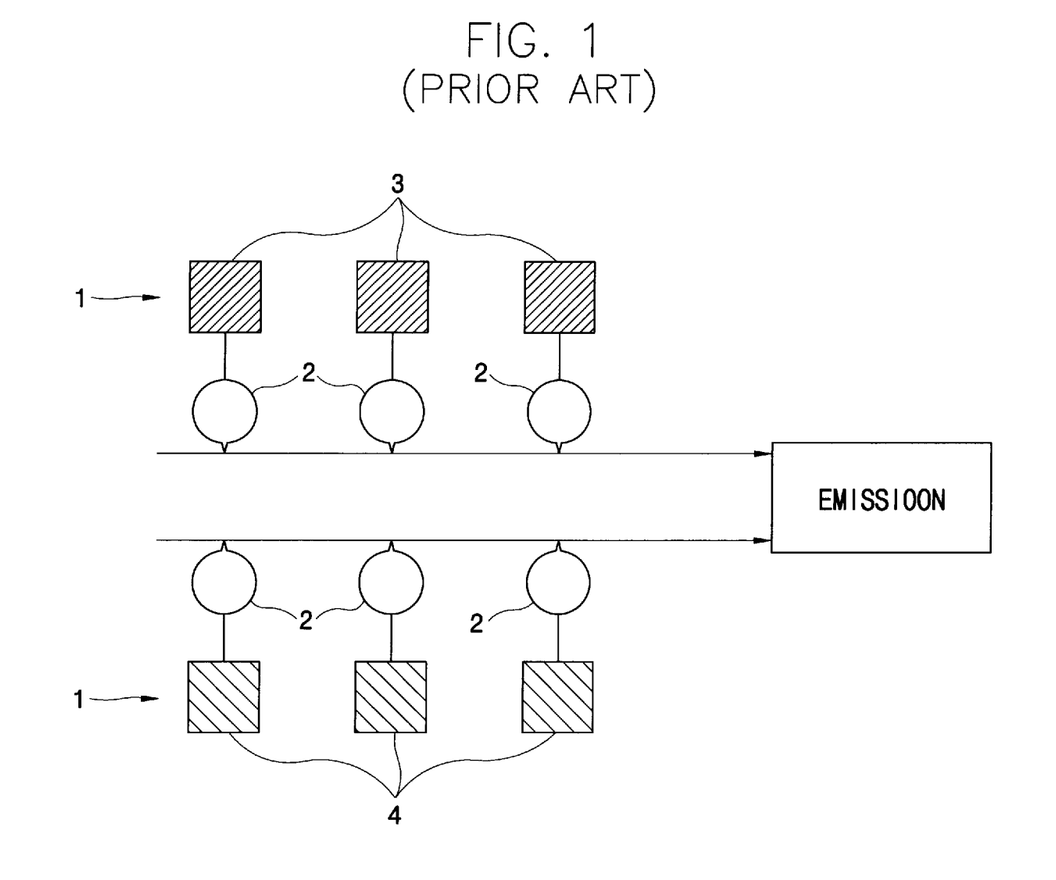
FIG. 1 is a schematic representation of a known process for reducing PFC emissions in which a separate treatment system is used for each device, or tool (e.g., etchers, CVD reactors) employed in the semiconductor manufacturing process.

Certain known emission reduction processes, as illustrated in FIG. 1, use separate abatement scrubbers 2 for each individual process component 1 (e.g., etch chambers 3, CVD reactors 4) before emission of the treated gas streams. Such processes, however, are expected to increase the overall cost of the semiconductor manufacturing process. Furthermore, it may be difficult to integrate the various abatement scrubbers into existing process layouts and to maintain the scrubbers once they are installed.

Figure 2:
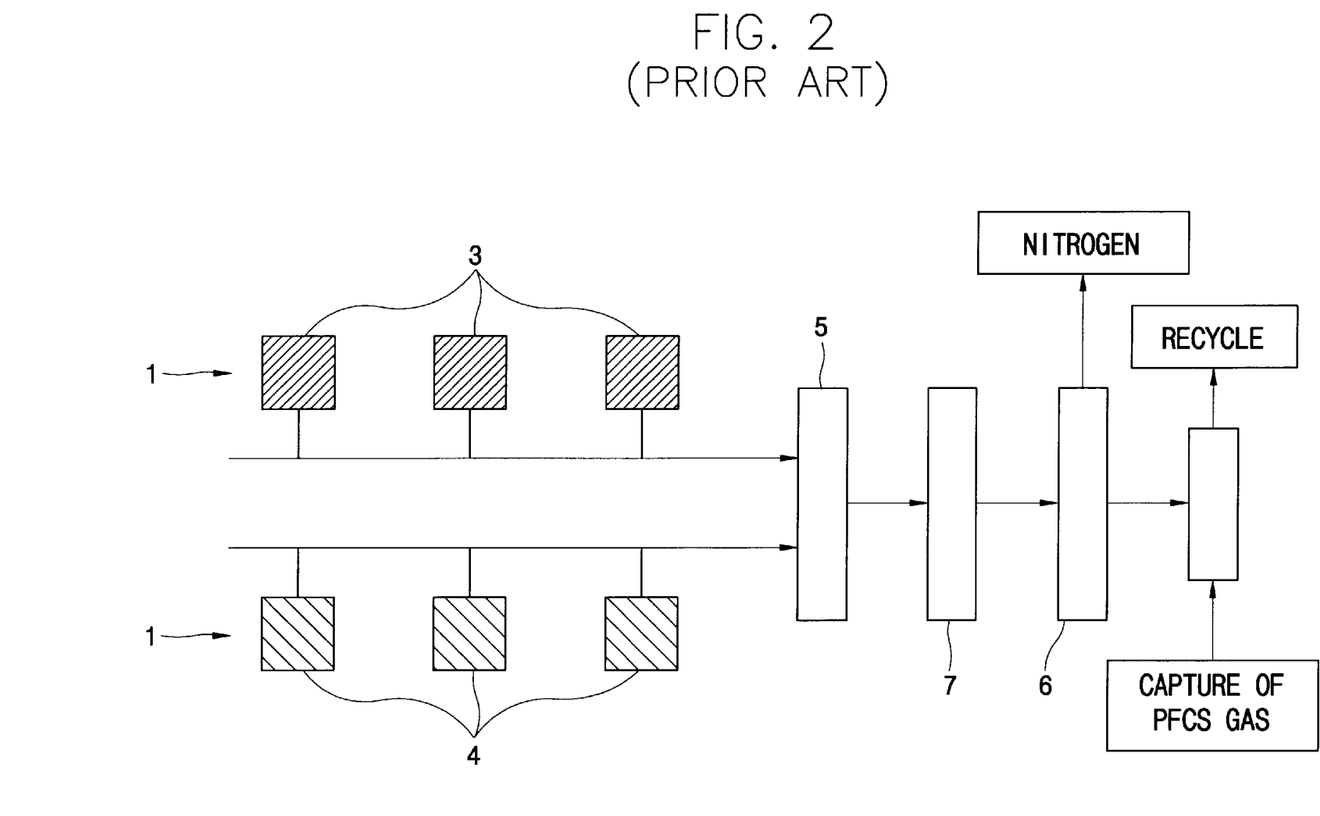
FIG. 2 is a schematic representation of a known process for reducing PFC emissions using a gas capture/recycle system.

Capture and recycle systems, such as the system of FIG. 2, direct process streams from, e.g., etch chambers 3 and CVD reactors 4 to a wet scrubbing system 5, then through a membrane 6 for separation and recycle of PFC gases and recovery of other process gases such as nitrogen. Such systems typically require pretreatment of powder components to remove moisture, as well as a powder removal system 7 downstream from the wet scrubbing system 5. Furthermore, the amounts of PFC's actually recycled typically is small due to the small amounts of PFC's that are captured. Moreover, if recycling proves impossible, another system must be employed to dispose of the captured PFC's.

Use of alternative process gases and process optimization have also proven problematic due to the insufficiency of suitable alternative gases and low process yield.

A continuing need exists for an improved process for reducing and minimizing the amounts of PFC's emitted during semiconductor manufacturing processes.

DESCRIPTION OF PREFERRED EMBODIMENTS

In accordance with one aspect of the present invention, a method of reducing PFC emissions during a semiconductor manufacturing process that has a plurality of sub-processes (e.g., dry etches, CVD) includes the steps of: exhausting PFC's produced by each sub-process to a common line; treating each combined exhaust stream using a PFC abatement system; combining the treated exhaust streams to form a combined treated stream; and wet scrubbing the combined treated stream.

In accordance with another aspect of the present invention, a method of reducing PFC emissions during a semiconductor manufacturing process that has a plurality of sub-processes including at least one etching sub-process and at least one CVD sub-process includes the steps of: exhausting PFC's produced by each etching sub-process to a first common line to form a combined etching exhaust stream; treating the combined etching exhaust stream using a first PFC abatement system; exhausting PFC's produced by each CVD sub-process to a second common line to form a combined CVD exhaust stream; treating the combined CVD exhaust stream using a second PFC abatement system; combining the treated combined etching exhaust stream and the treated combined CVD exhaust stream to form a combined treated stream; and wet scrubbing the combined treated stream.

According to a further aspect of the present invention, a system for reducing PFC emissions during a semiconductor manufacturing process that has a plurality of sub-processes includes: a first plurality of devices for carrying out a first subprocess; a first common line for PFC's exhausted from the first plurality of devices; a first PFC abatement system connected to the first common line; a second plurality of devices for carrying out a second sub-process; a second common line for PFC's exhausted from the second plurality of devices; a second PFC abatement system connected to the second common line; a common treated exhaust line connected to the first and second PFC abatement systems; and a wet scrubbing system connected to the common treated exhaust line.

According to an additional aspect of the present invention, a system for reducing PFC emissions during a semiconductor manufacturing process that includes a first plurality of etching sub-processes and at least one CVD sub-process, each of which produces at least one PFC. The system includes: a first plurality of devices comprising at least one device for carrying out each of the first plurality of etching sub-process; a sub-process common line associated with each etching sub-process for PFC's exhausted from the at least one device for carrying out each of the etching sub-processes; a first common line for receiving PFC's exhausted from the first plurality of devices; a first PFC abatement system connected to the first common line; a second plurality of devices for carrying out the at least one CVD sub-process; a second common line for PFC's exhausted from the second plurality of devices; a second PFC abatement system connected to the second common line; a common treated exhaust line connected to the first and second PFC abatement systems; and a wet scrubbing system connected to the common treated exhaust line.

In more particular embodiments, sensors for the detection and measurement of PFC's are disposed at the inlets and/or outlets of the PFC abatement systems.

Other features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which like elements are numbered alike throughout.

DETAILED DESCRIPTION OF PREFERRED EMBODIMENTS

Figure 3:
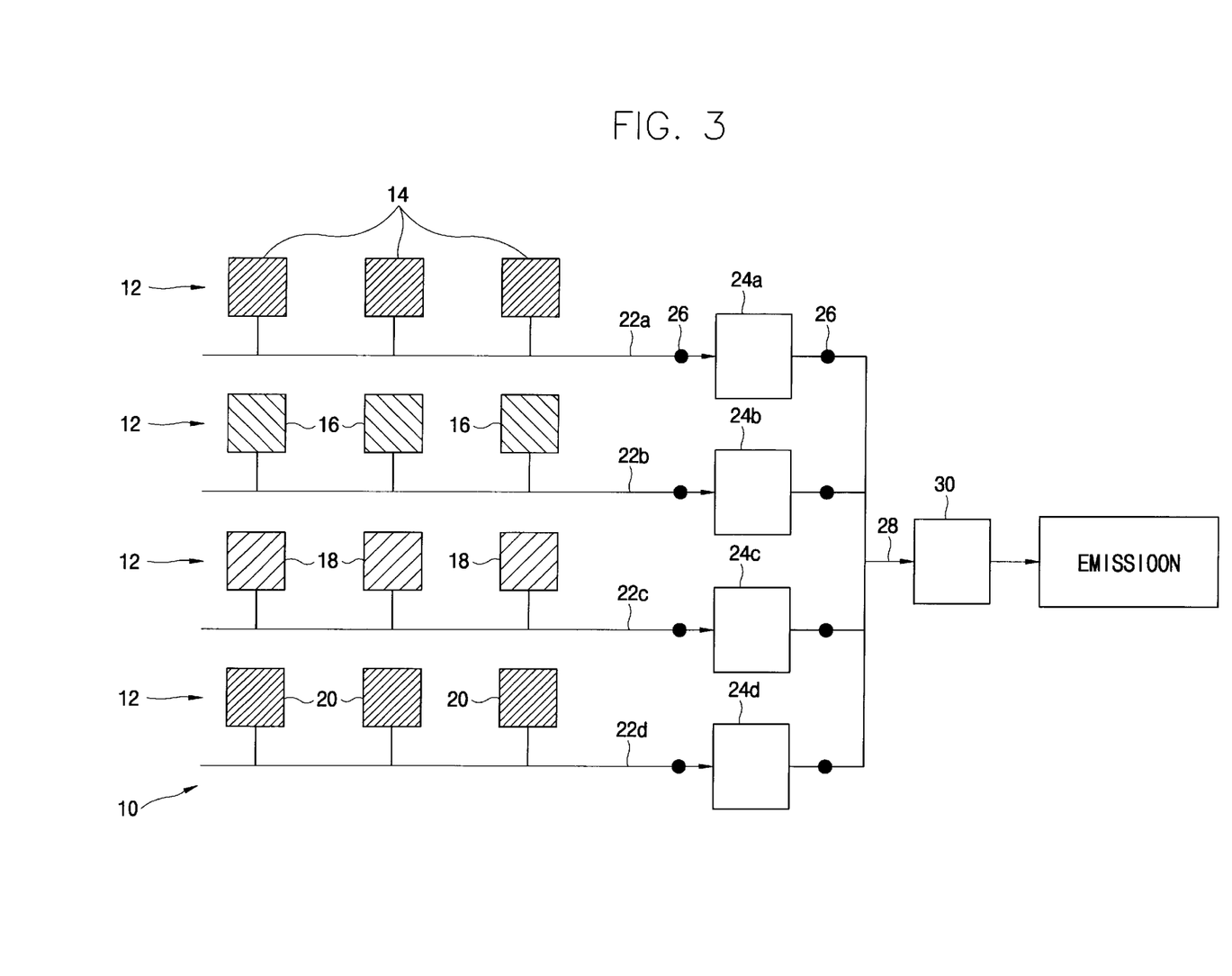
FIG. 3 is a schematic representation of a first embodiment of a PFC emission reduction method of the invention, in which each separate sub-process of the overall semiconductor manufacturing process (e.g., oxide etching, poly etching, metal etching, chemical vapor deposition (CVD)) includes one or more individual devices, or tools, and emissions from each sub-process are received by a common exhaust line leading to a PFC abatement system dedicated to that sub-process, after which the exhausts from each PFC abatement system are combined and fed to a common wet scrubbing system.

According to a first particular embodiment of the invention exemplified by FIG. 3, a system 10 for reducing PFC emissions during semiconductor manufacture includes a plurality of sub-process devices 12, for example without limitation, a first plurality of oxide etchers 14, a second plurality of poly etchers 16, a third plurality of metal etchers 18, and a fourth plurality of CVD reactors 20. Exhaust streams containing PFC's from each plurality of like sub-process devices are exhausted to a separate common line 22a–d, thereby forming a plurality of common exhaust streams. Next, each common exhaust stream is directed to a separate PFC abatement system 24a–d, and is treated to remove at least one PFC. The treated exhaust streams are then combined into common line 28 to form a combined treated stream. The combined treated stream is then directed to a wet scrubbing system 30 to remove hazardous air pollutants. After removal of hazardous air pollutants, the purified combined exhaust stream is then exhausted to the atmosphere.

The PFC abatement systems 24a–d can include, in specific embodiments, combustion scrubbers, for example using fuel gases such as $CH_4$ or $H_2$; chemisorption scrubbers, for example using applied metal oxide resins including Fe, Cu, Mn, Ni, Sr and the like; physical adsorption scrubbers using, for example, active carbon and/or zeolites; and wet scrubbers using hydroxides such as NaOH and KOH in deionized water. These PFC abatement systems can be used alone or in any combination.

Figure 5:
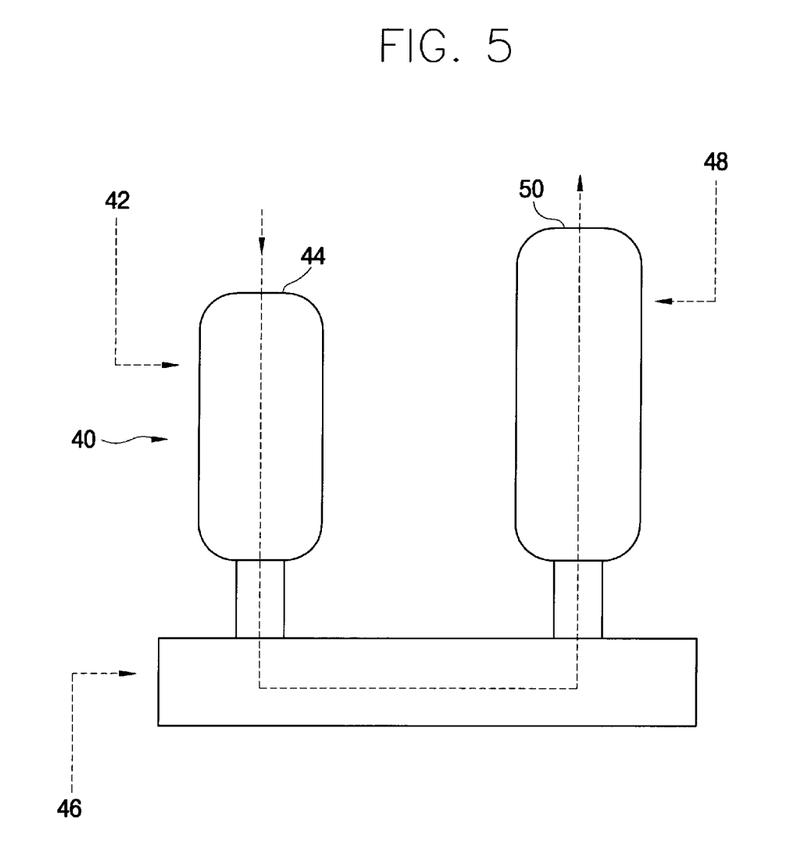
FIGS. 5–7 are illustration of exemplary PFC abatement systems that can be employed in particular embodiments of the inventive method and apparatus.
Figure 6:
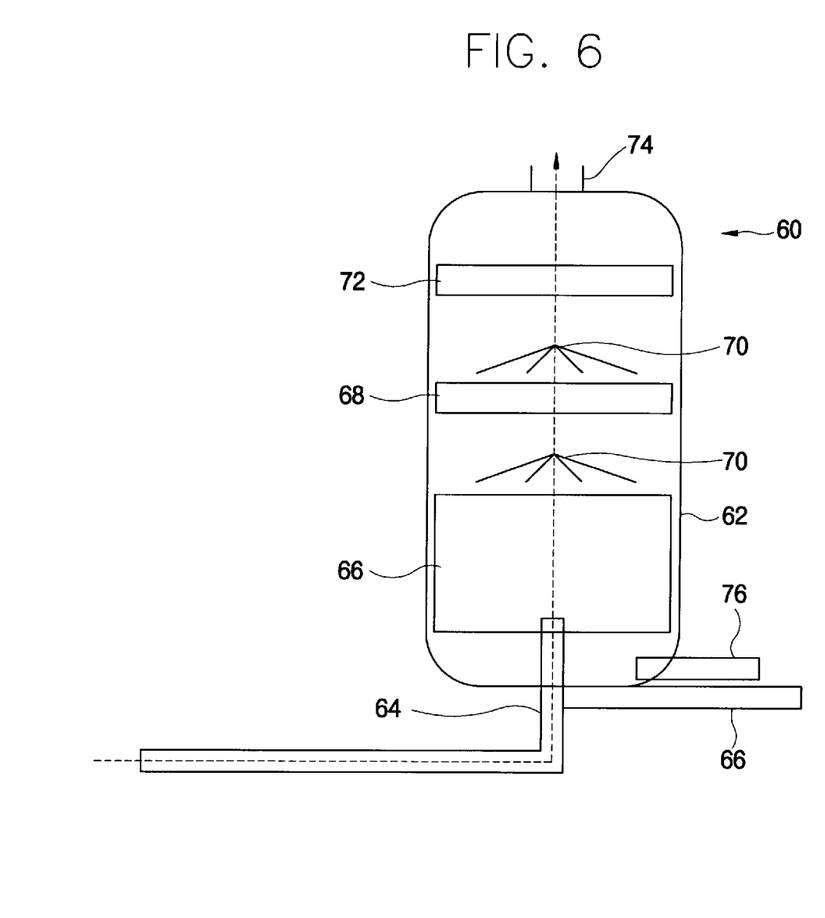
Figure 7:
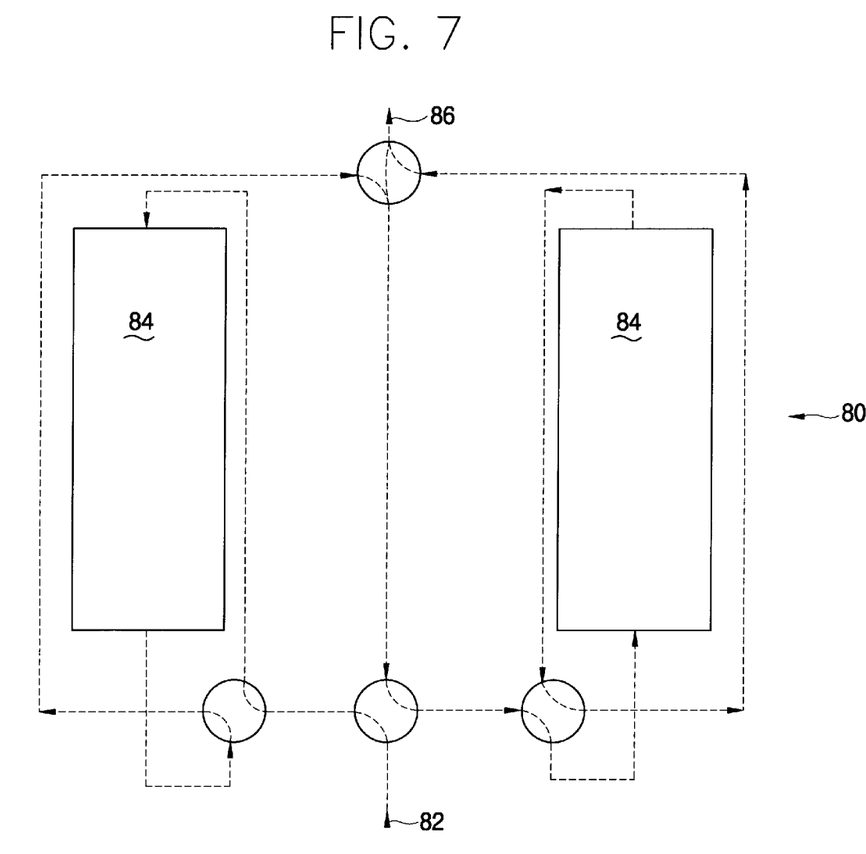

Exemplary PFC abatement systems are illustrated in FIGS. 5–7. Thus, in FIG. 5, a first fuel burn and wet-type PFC abatement system 40 includes combuster 42 with inlet 44, cyclone scrubber 46, and wet scrubber 48 with outlet 50. In system 40, an exhaust stream containing PFC's enters via inlet 44 of combuster 42 and proceeds through cyclone 46 into scrubber 48 and out through outlet 50.

In FIG. 6, a second fuel burn and wet-type PFC abatement system 60 in a unitary device having a housing 62, an inlet 64 for the exhaust stream to be treated, and a fuel gas inlet line 66 upstream from inlet 64. The combined exhaust stream and fuel gas enter burner 66, where combustion occurs. The combusted stream then passes through filter 68, disposed between water sprays 70, then through demister 72 and out of housing 62 via outlet 74. Water from sprays 70 exits via waterdrain 76.

In FIG. 7, a chemisorption PFC abatement system 80 includes inlet 82, a plurality of resin-packed units 84, and outlet 86. The exhaust stream to be treated inters via inlet 82 and is directed through units 84 by means of appropriate lines and valves along the path indicated, finally emerging from outlet 86 as a treated exhaust stream. Other types of abatement scrubbers can also be employed as desired.

Figure 4:
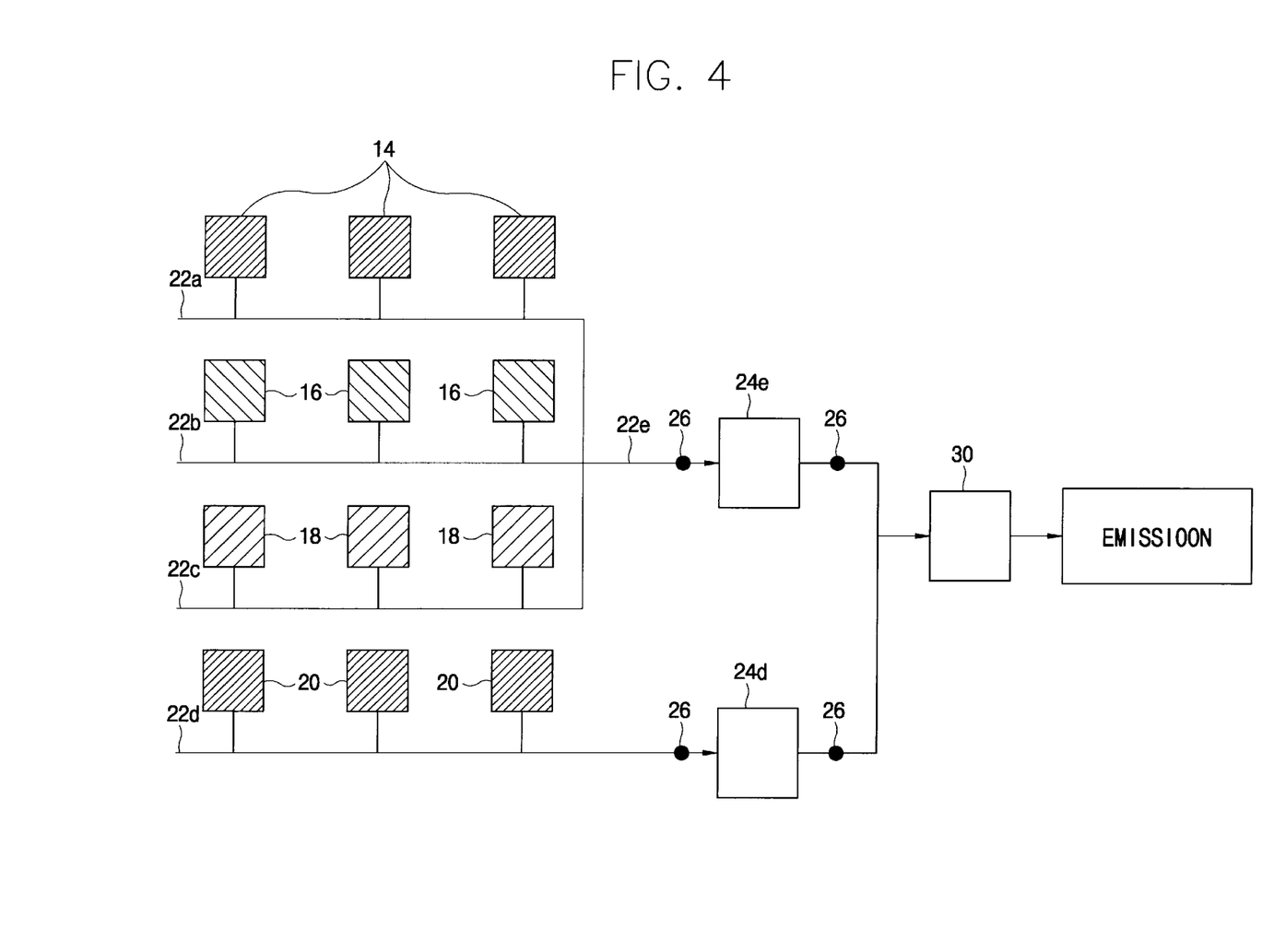
FIG. 4 is a schematic representation of a second embodiment of a PFC emission reduction method of the invention, in which emissions from dry etchers used in each dry etching sub-process are combined and directed to a first PFC abatement system, while emissions from CVD reactors used in a CVD sub-process are directed to a second PFC abatement system, after which the exhausts from the first and second PFC abatement systems are combined and fed to a common wet scrubbing system.

In dry etch processes, such as oxide, poly or metal dry etch processes, it is often impossible to exhaust PFC's and other process gases separately, due to the nature of the processes. Thus, the exhaust streams from dry etch devices have chemical compositions that differ from that of the exhaust streams from CVD reactors used in other sub-processes of the overall semiconductor manufacturing process. Accordingly, in further embodiments of the invention as exemplified by FIG. 4, PFC's from the devices 14, 16 and 18 used in each etching sub-process of the overall semiconductor manufacturing process are exhausted to a common line 22e from the various lines 22a–c dedicated to each etching sub-process, and these combined exhausts are then directed to a first PFC abatement system 24e for treatment. PFC's from the device(s) 20 used in CVD sub-processes of the overall semiconductor manufacturing process are exhausted to another common line 22d, as in the preceding embodiment, and directed to a second PFC abatement system 24d. The treated exhausts from the PFC abatement systems 24e and 24d are then combined and directed to wet scrubbing system 30 to remove hazardous air pollutants, and subsequently exhausted to the atmosphere.

In particular embodiments, sensors 26 are installed at the inlets and/or outlets of the PFC abatement systems in order to measure the amounts of PFC's contained in the untreated and/or treated exhaust streams. Such sensors facilitate control of the PFC reduction process.

The inventive methods and systems afford the advantages of significant reductions in the emission of PFC's and a consequent reduction in associated global warming due to such emission. The inventive methods and systems can readily be adapted to existing manufacturing equipment, require limited investment in new equipment and incur low maintenance expenditures.

What is claimed is:

1. A method of reducing PFC emissions during a semiconductor manufacturing process that includes a plurality of sub-processes each of which produces at least one PFC, the method comprising the steps of:

(i) exhausting PFC's produced by each sub-process to a common line to form a combined exhaust stream;

(ii) treating the combined exhaust stream from each sub-process using a separate PFC abatement system;

(iii) combining the treated exhaust streams to form a combined treated stream; and (iv) wet scrubbing the combined treated stream.

2. A method as claimed in claim 1, wherein the sub-processes are selected from the group consisting of dry etch processes and CVD processes.

3. A method as claimed in claim 2, wherein said dry etch processes are selected from the group consisting of oxide etch processes, poly etch processes and metal etch processes.

4. A method as claimed in claim 1, wherein in step (ii) each PFC abatement system is independently selected from the group consisting of combustion scrubbers, chemisorption scrubbers, physical adsorption scrubbers, wet scrubbers and combinations thereof.

5. A method as claimed in claim 1, wherein at least one combined exhaust stream is passed through a sensor which measures the amount of at least one PFC in the exhaust stream.

6. A method as claimed in claim 5, wherein the combined exhaust stream is passed through a sensor prior to step (ii).

7. A method as claimed in claim 5, wherein the combined exhaust stream is passed through a sensor after step (ii).

8. A method of reducing PFC emissions during a semiconductor manufacturing process that includes a plurality of sub-processes each of which produces at least one PFC, the sub-processes including at least one etching sub-process and at least one CVD sub-process, the method comprising the steps of:

(i) exhausting PFC's produced by each etching sub-process to a first common line to form a combined etching exhaust stream;

(ii) treating the combined etching exhaust stream using a first PFC abatement system;

(iii) exhausting PFC's produced by each CVD sub-process to a second common line to form a combined CVD exhaust stream;

(iv) treating the combined CVD exhaust stream using a second PFC abatement system;

(v) combining the treated combined etching exhaust stream and the treated combined CVD exhaust stream to form a combined treated stream; and (v) wet scrubbing the combined treated stream.

9. A method as claimed in claim 8, wherein the dry etching process is selected from the group consisting of oxide etching processes, poly etching processes and metal etching processes.

10. A method as claimed in claim 8, wherein the first and second PFC abatement systems are independently selected from the group consisting of combustion scrubbers, chemisorption scrubbers, physical adsorption scrubbers, wet scrubbers and combinations thereof.

11. A method as claimed in claim 8, wherein at least one of the combined etching exhaust stream and the combined CVD exhaust stream is passed through a sensor which measures the amount of at least one PFC in the exhaust stream.

12. A method as claimed in claim 11, wherein the at least one combined exhaust stream is passed through a sensor prior to treatment by a PFC abatement system.

13. A method as claimed in claim 11, wherein the at least one combined exhaust stream is passed through a sensor after treatment by a PFC abatement system.

14. A system for reducing PFC emissions during a semiconductor manufacturing process that includes a plurality of sub-processes each of which produces at least one PFC, the system comprising:

(a) a first plurality of devices for carrying out a first sub-process;

(b) a first common line for PFC's exhausted from the first plurality of devices;

(c) a first PFC abatement system connected to the first common line;

(d) a second plurality of devices for carrying out a second sub-process;

(e) a second common line for PFC's exhausted from the second plurality of devices;

(f) a second PFC abatement system connected to the second common line;

(g) a common treated exhaust line connected to the first and second PFC abatement systems; and (h) a wet scrubbing system connected to the common treated exhaust line.

15. The system as claimed in claim 14, further comprising at least one sensor for measuring the amount of at least one PFC in at least one stream prior to or after treatment by at least one of the first and second PFC abatement systems.

16. A system for reducing PFC emissions during a semiconductor manufacturing process that includes a first plurality of etching sub-processes and at least one CVD sub-process, each of which produces at least one PFC, the system comprising:

(a) a first plurality of devices comprising at least one device for carrying out each of the first plurality of etching sub-process;

(b) a sub-process common line associated with each etching sub-process for PFC's exhausted from the at least one device for carrying out each of the etching sub-processes;

(c) a first common line for receiving PFC's exhausted from the first plurality of devices;

(d) a first PFC abatement system connected to the first common line;

(e) a second plurality of devices for carrying out the at least one CVD sub-process;

(f) a second common line for PFC's exhausted from the second plurality of devices;

(g) a second PFC abatement system connected to the second common line;

(h) a common treated exhaust line connected to the first and second PFC abatement systems; and (i) a wet scrubbing system connected to the common treated exhaust line.

17. The system as claimed in claim 16, further comprising at least one sensor for measuring the amount of at least one PFC in at least one stream prior to or after treatment by at least one of the first and second PFC abatement systems.

* * * * *